2,909,510

PROPYLENE POLYMERIZATION PROCESS

Walter William Thomas, Wilmington, Del., assignor to Hercules Powder Company, Wilmington, Del., a corporation of Delaware No Drawing. Application November 20, 1958
Serial No. 775,122

7 Claims. (Cl. 260—93.7)

This invention relates to an improved process for the polymerization of propylene and, more particularly, to a modification of the so-called Ziegler-type polymerization process whereby high molecular weight crystalline polypropylene is selectively produced by an economic and commercially feasible process.

As is now well known, 1-olefins may be polymerized according to the Ziegler process at relatively low temperatures and atmospheric pressure by contacting the olefin with the catalyst produced by mixing a titanium compound with an organoaluminum compound. An especially effective and practical catalyst for the polymerization of propylene is titanium trichloride activated by an alkylaluminum compound. However, the product normally consists of a mixture of crystalline and amorphous polymers.

Now, in accordance with this invention, it has been found that the rate of polymerization and/or selectivity in the production of crystalline polypropylene is increased when a dialkylaluminum halide is used to activate the titanium trichloride, if there has been added to the dialkylaluminum halide-titanium chloride mixture, an alkali metal halide. In addition to the advantages of increased rate and selectivity, an exceptionally superior polypropylene is produced when the dialkylaluminum halide-titanium trichloride mixture has been treated with the metal halide. The polymerization of propylene may then, in accordance with this invention, be carried out by contacting the propylene with the catalyst formed by mixing titanium trichloride with a dialkylaluminum halide and an alkali metal halide in an amount equal to at least about 0.2 mole of metal halide per mole of dialkylaluminum halide used in the polymerization process.

The salt treatment of the dialkylaluminum halide-titanium trichloride catalyst mixture may be carried out in a variety of ways. The solid alkali metal halide or alkaline earth metal halide may simply be mixed with the titanium trichloride-dialkylaluminum halide catalyst or added to the suspension-solution of it in the inert organic diluent used in the polymerization reaction. Another method is to add a suspension of the salt in such a diluent to the dialkylaluminum halide-titanium trichloride catalyst mixture. As stated above, the amount of the metal halide added should be an amount equal to at least 0.2 mole per mole of dialkylaluminum halide used as activator for the titanium trichloride, and preferably will be an amount equal to from about 0.2 to about 2.5 moles per mole of dialkylaluminum halide. Obviously, large excesses of salt may be used without interfering with the polymerization reaction so long as the amount of salt does not interfere with the reactor efficiency, i.e., space considerations, agitation, etc. The salt may be added to the dialkylaluminum halide-titanium trichloride mixture at room temperature and allowed to stand from a few minutes up to any period of storage time. Preferably the mixture is heated, as for example, to a temperature of 50-100° C. and then used or again held at room temperature until desired for use in the polymerization system.

Any halide of an alkali metal may be used for treating the dialkylaluminum halide-titanium trichloride catalyst mixture used in the polymerization of propylene in accordance with this invention. Exemplary of such salts are the fluorides, chlorides, bromides or iodides of lithium, sodium, potassium, etc. For maximum effectiveness the salt should be in a finely divided state such as may be obtained by grinding or ball milling the salt.

Any dialkylaluminum halide-titanium trichloride mixture may be treated with the alkali metal halide as described above and used for the initiation of the polymerization reaction in accordance with this invention. Exemplary of the dialkylaluminum halides that may be used in the dialklaliuminum halide-titanium trichloride catalyst mixture and treated with salt are the dimethyl-, diethyl-, dipropyl-, dibutyl-, diisobutyl-, dioctyl-aluminum, etc., halides such as the chlorides, bromides or iodides.

The polymerization process may be carried out in any desired fashion by a batchwise or continuous process. Generally it will be carried out in an inert organic liquid diluent as the reaction medium, and particularly in an inert hydrocarbon diluent such as hexane, heptane, cyclohexane, mixtures of such hydrocarbons, etc.

The selection of the temperature and pressure used for the polymerization process will obviously depend upon the activity of the catalyst system being used, the degree of polymerization desired, etc. In general, the polymerization will be carried out at room temperature or slightly above, but any temperature within the range of from about $-50°$ C. to about $150°$ C. and preferably from about $0°$ C. to about $100°$ C. may be used. In the same way, while atmospheric pressure or a pressure of only a few pounds may be used, the polymerization may be carried out over a wide range of pressures, as for example, from a partial vacuum to about 1000 lbs. and preferably from about atmospheric to about 500 lbs. pressure. Higher pressures may, of course, be used, but generally do not appreciably alter the course of the polymerization.

In the selective polymerization of propylene to produce predominantly a crystalline polymer, in accordance with this invention, titanium trichloride is used as the transition metal compound in combination with the dialkylaluminum halide. The titanium trichloride may be the so-called authentic titanium trichloride, such as is produced by the reduction of titanium tetrachloride with hydrogen, electrical discharge, etc., or it may be the product produced on reaction of titanium tetrachloride with an organometallic compound of a metal of groups I-A, II-A or III-A of the periodic table. It is now well accepted that when titanium tetrachloride is reacted with such an organometallic compound, the hydrocarbon-insoluble precipitate which forms when the reaction is carried out in an inert organic diluent is, at least in part, titanium trichloride. However, the crystalline form of this titanium trichloride is different from that produced on hydrogenation of titanium tetrachloride. In any event, either may be used as the catalyst in the polymerization process of this invention, activated with alkylaluminum halide, and this mixture treated with salt.

Any organometallic compound of a metal of groups I-A, II-A or III-A of the periodic table may be used to reduce the titanium tetrachloride to a titanium trichloride useful in the polymerization reaction. Generally the reaction is carried out in an inert organic liquid as diluent such as is used in the polymerization process. The reaction may be carried out at any temperature, but generally is carried out at room temperature or below. The titanium trichloride then separates as a hydrocarbon-insoluble precipitate which, if desired, may be separated, washed with fresh diluent and used in the polymerization process. Various other treatments may be applied to it, as for example, heat-treatment prior to or after separation from the diluent, etc. Exemplary of the organometallic compounds that may be used to so reduce the titanium tetrachloride to titanium trichloride are alkali metal alkyls or aryls such as butyllithium, amylsodium, phenylsodium, etc., dimethylmagnesium, diethylmagnesium, diethylzinc, butylmagnesium chloride, phenylmagnesium bromide, triethylaluminum, tripropylaluminum, triisobutylaluminum, trioctylaluminum, tridodecylaluminum, dimethylaluminum chloride, diethylaluminum bromide, diethylaluminum chloride, ethylaluminum dichloride, the equimolar mixture of the latter two known as aluminum sesquichloride, dipropylaluminum fluoride, diisobutylaluminum fluoride, diethylaluminum hydride, ethylaluminum dihydride, diisobutylaluminum hydride, etc., and complexes of such organometallic compounds, as for example, sodium aluminum tetraethyl, lithium aluminum tetraoctyl, etc. The molar ratio of the organometallic compound to the titanium tetrachloride may be varied over a wide range, but there should be used an amount of the organometallic compound that will produce the desired amounts of reduction. Thus, larger ratios of organometallic compound to the transition metal compound are required for alkali metal alkyls than for trialkylaluminum compound, and in the same way more of an alkylaluminum dihalide is required than of a dialkylaluminum monohalide. In general, the molar ratio will be from about 0.1:1 to 100:1 and more usually will be from about 0.3:1 to 10:1.

The polymerization reaction may be carried out in any of the usual manners. Thus the titanium trichloride, salt, and dialkylaluminum halide may be charged with the diluent into the polymerization vessel and the olefin then passed in, or each or both of the catalyst components may be added in increments or continuously throughout the polymerization. Many other variations may, of course, be used in the process.

The following examples will illustrate the process of this invention. All parts and percentages are by weight unless otherwise indicated.

titanium tetrachloride of 0.4. After standing for several hours, the titanium trichloride precipitate was separated, resuspended in fresh diluent and then heated for 4 hours at 85° C. The amount of diluent charged to each polymerization vessel was 310 parts of the mixture of inert liquid hydrocarbons having a boiling range of about 190–230° C. To each vessel was then added sodium chloride, an amount of diethylaluminum chloride equal to 20 millimoles per liter and an amount of triethylaluminum equal to 0.5 millimole per liter. There was then charged to each of the vessels the titanium trichloride suspension in an amount equal to 10 millimoles per liter and the mixture was then heated to 80° C. for 0.5 hour. With the temperature lowered to 50° C. in Examples 1–5 and raised to 85° C. in Examples 6–8, propylene was passed in at 15 p.s.i.g. After 4.5 hours each of the polymerizations was stopped by ceasing the propylene feed, bleeding off the excess gas, and adding an amount of n-butanol equal to 4% by volume of the reaction mixture. The polymer slurry obtained in each case was then discharged and weighed, after which the solid polymer was separated by filtration, washed thoroughly with fresh hydrocarbon diluent at 50° C., again filtered and dried in a vacuum oven at 80–85° C. for 16 hours. The white solid crystalline polypropylene obtained in each case was then determined and from the materials balance of the products recovered, the percent of the total polymer was calculated, as was the rate of formation of the hydrocarbon-insoluble polymer. To the crystalline polypropylenes so obtained in each example there was then added 0.5% by weight of a commercial stabilizer known as Santonox [4,4'-thiobis(6-tertbutyl-m-cresol)] and the polymer was passed into a film on which the Rockwell hardness and torsional rigidity at 120° C. was determined. The amount of salt used in each of the examples, expressed as the millimoles per liter of reaction mixture is set forth in the following table along with the mole ratio of salt to diethylaluminum chloride, used in each of the examples, the rate at which the hydrocarbon-insoluble polymer was formed in grams per liter per hour, the percentage of the total polymer and the torsional rigidity and Rockwell hardness of each of the polymers produced.

*Table I*

SERIES CARRIED OUT AT POLYMERIZATION TEMPERATURE OF 50° C.

| Ex. No. | Mmoles/l. NaCl | Mole Ratio NaCl:(C$_2$H$_5$)$_2$AlCl | Rate, g./l./hr. | Hydrocarbon-Insoluble Polymer | | |
|---|---|---|---|---|---|---|
| | | | | Percent of Total Polymer | Torsional Rigidity, p.s.i. at 120° C. | Rockwell Hardness |
| Control | 0 | -------- | 55.0 | 96 | 3,820 | 79 |
| 1 | 4.2 | 0.2 | 59.2 | 96.5 | 5,090 | 90 |
| 2 | 8.5 | 0.4 | 63.2 | 96.5 | 4,220 | 87 |
| 3 | 17 | 0.85 | 69.6 | 96 | 4,570 | 87 |
| 4 | 25.5 | 1.25 | 66.8 | 96 | 4,670 | 83 |
| 5 | 42.5 | 2.13 | 69.6 | 97 | 4,230 | 79 |

SERIES CARRIED OUT AT POLYMERIZATION TEMPERATURE OF 85° C.

| Ex. No. | Mmoles/l. NaCl | Mole Ratio NaCl:(C$_2$H$_5$)$_2$AlCl | Rate, g./l./hr. | Percent of Total Polymer | Torsional Rigidity, p.s.i. at 120° C. | Rockwell Hardness |
|---|---|---|---|---|---|---|
| Control | 0 | -------- | 51.3 | 78.5 | 4,850 | 85 |
| 6 | 4.2 | 0.2 | 37.6 | 83.5 | 5,750 | 96 |
| 7 | 8.5 | 0.4 | 31.5 | 84.0 | 6,670 | 97 |
| 8 | 42.5 | 2.13 | 31.1 | 83.4 | 5,670 | 85 |

EXAMPLES 1–8

The titanium trichloride used in each of these examples was a suspension in a mixture of inert liquid hydrocarbons having a boiling range of about 190° C. to 230° C., which suspension had been prepared by adding a solution, in said hydrocarbon, of ethylaluminum sesquichlorides (weight ratio of monoethylaluminum dichloride to diethylaluminum chloride of 60:40) to a solution in the same hydrocarbon of titanium tetrachloride in a molar ratio of diethylaluminum chloride to

EXAMPLES 9 AND 10

In these examples a commercial so-called authentic titanium trichloride was used as the catalyst for the polymerization of propylene and was activated by the addition of diethylaluminum chloride which had been pretreated with sodium chloride. In each example 310 parts of a mixture of inert liquid hydrocarbons having a boiling range of about 190–230° C. was charged to the polymerization vessel along with an amount of diethylaluminum chloride equivalent to 20 millimoles per liter and an amount of sodium chloride equal to 20 millimoles per liter. There was then charged to each of the vessels an amount of commercial titanium trichloride equal to 10 millimoles per liter. With the temperature held at 50° C. in Example 9 and 85° C. in Example 10, propylene was passed in at 15 p.s.i.g. After 5 hours each of the polymerizations was stopped and the crystalline polypropylene isolated as described in the foregoing examples. In Example 9 the amount of crystalline polypropylene obtained amounted to 93.3% of the total polymer as compared with 84.5% when no salt was added to the diethylaluminum-titanium trichloride catalyst mixture. In Example 10 the crystalline polypropylene amounted to 90% of the total polymer in comparison with an 81.5% yield when no salt was added to the diethylaluminum chloride-titanium trichloride catalyst mixture.

The foregoing examples very clearly demonstrate the very real improvement that is obtained in the polymerization rate and/or production of crystalline polymer when the dialkylaluminum halide-titanium trichloride catalyst has been treated with an alkali metal halide. It may further be seen from these examples that the crystalline polypropylene so produced has greatly improved physical properties having a torsional rigidity and Rockwell hardness much higher than that produced in the absence of the alkali metal halide.

What I claim and desire to protect by Letters Patent is:

1. The process of polymerizing propylene which comprises contacting propylene with at least a catalytic amount of a catalyst formed by mixing titanium trichloride with an activator selected from the group consisting of dialkylaluminum halides and mixtures of dialkylaluminum halides with trialkylaluminums and with at least about 0.2 mole of an alkali metal halide per mole of dialkylaluminum halide.

2. The process of claim 1 wherein the alkali metal halide is sodium chloride.

3. The process of claim 2 wherein the activator consists of a dialkylaluminum halide.

4. The process of claim 3 wherein the dialkylaluminum halide is diethylaluminum chloride.

5. The process of claim 2 wherein the activator consists of a mixture of a dialkylaluminum halide and a trialkylaluminum.

6. The process of claim 5 wherein the activator consists of a mixture of diethylaluminum chloride and triethylaluminum.

7. The process of claim 4 wherein the mole ratio of sodium chloride to diethylaluminum chloride is from about 0.2 to about 2.5.

References Cited in the file of this patent

UNITED STATES PATENTS

| | | |
|---|---|---|
| 2,840,551 | Field et al. | June 24, 1958 |
| 2,846,427 | Findlay | Aug. 5, 1958 |